United States Patent
Moore et al.

[19]

[11] Patent Number: 5,889,392
[45] Date of Patent: Mar. 30, 1999

[54] SWITCH-MODE REGULATORS AND METHODS PROVIDING TRANSIENT RESPONSE SPEED-UP

[75] Inventors: Bruce Dudley Moore, Santa Clara; Jean Fongyee Yamamoto Hsu, San Jose, both of Calif.

[73] Assignee: Maxim Integrated Products, Inc., Sunnyvale, Calif.

[21] Appl. No.: 810,831

[22] Filed: Mar. 6, 1997

[51] Int. Cl.$^6$ ............................... G05F 1/56; H02M 3/335
[52] U.S. Cl. ............................................ 323/282; 363/17
[58] Field of Search ................................... 323/282, 284, 323/285, 351; 363/17, 49, 50

[56] References Cited

U.S. PATENT DOCUMENTS

| | | | |
|---|---|---|---|
| 4,578,630 | 3/1986 | Grosch | 323/271 |
| 4,800,476 | 1/1989 | Harada et al. | |
| 4,825,018 | 4/1989 | Okada et al. | 323/351 |
| 4,829,259 | 5/1989 | Konopka | 320/21 |
| 4,947,309 | 8/1990 | Jonsson | 363/17 |
| 5,264,743 | 11/1993 | Nakagome et al. | |
| 5,414,341 | 5/1995 | Brown | 323/268 |
| 5,528,132 | 6/1996 | Doluca | |
| 5,534,817 | 7/1996 | Suzuki et al. | |
| 5,612,860 | 3/1997 | Meszlenyi | 363/49 |
| 5,668,703 | 9/1997 | Rossi et al. | 363/16 |
| 5,675,476 | 10/1997 | Nostwick | 363/17 |
| 5,677,619 | 10/1997 | Doluca | 323/282 |

FOREIGN PATENT DOCUMENTS

| | | |
|---|---|---|
| 0545266A2 | 11/1992 | European Pat. Off. . |
| 06225522 | 8/1994 | Japan . |

*Primary Examiner*—Adolf Deneke Berhane
*Attorney, Agent, or Firm*—Blakely, Sokoloff, Taylor & Zafman LLP

[57] ABSTRACT

Switch-mode regulators and methods providing transient response speed-up in the presence of large load transients. Speed-up is achieved by coupling a first MOSFET switch between the regulator output and the input voltage and a second MOSFET switch between the regulator output and the circuit common connection. During normal operation these MOSFETs are off, but in the event of a large load transient substantially disturbing the regulator output, one of the MOSFETs is momentarily turned on to couple the regulator output to the input voltage or circuit ground as appropriate to bring the regulator output within a narrow range around the nominal output voltage. Operation of the MOSFETs is disabled on startup until the regulator output is within a predefined range, and whenever the regulator output exceeds a limit range indicative of a fault condition.

39 Claims, 3 Drawing Sheets

SWITCH-MODE REGULATORS AND METHODS PROVIDING TRANSIENT RESPONSE SPEED-UP

BACKGROUND OF THE INVENTION

1. Field of the Invention

The present invention relates to the field of switch-mode voltage regulators.

2. Prior Art

Switch-mode voltage regulators have inherent limitations in their ability to maintain a constant output voltage in the face of fast load transients. This is particularly true when they are used to power the new generation of microprocessor ICs, which can change their load current demand from hundreds of milliamps to tens of amps in less than 100 nanosec. Switch-mode regulators have difficulty in supplying such load transients due to both the filtering effect of inductors and transformers used in them, and also the parasitic effective series resistance of the output filter capacitors which cause a nearly instantaneous I×R output voltage drop when hit with a sudden load current surge.

The standard methods for dealing with these problems are to place additional parallel capacitors at the output to reduce the parasitic effective series resistance of the output filter capacitors, and to decrease the inductance values in the switch-mode regulator. However these solutions are unfavorable in cost and size for the large and sudden transients encountered with the new generation microprocessor ICs. Another method that has at least been suggested is to couple a linear regulator in series from the switch-mode regulator output voltage to the load. This approach should operate well in the presence of occasional large load transients, but the linear regulators are very inefficient and get quite hot if the load transients happen with great frequency, as is the case with modern microprocessors that employ halt-clock and stop-grant states. A linear regulator may be coupled in parallel with the switch-mode regulator, but here again the linear regulator gets hotter than the switch mode regulator, and is inefficient.

BRIEF SUMMARY OF THE INVENTION

Switch-mode regulators and methods providing transient response speed-up in the presence of large load transients. Speed-up is achieved by coupling a first MOSFET switch between the regulator output and the input voltage and a second MOSFET switch between the regulator output and the circuit common connection. During normal operation these MOSFETs are off, but in the event of a large load transient substantially disturbing the regulator output, one of the MOSFETs is momentarily turned on to couple the regulator output to the input voltage or circuit ground as appropriate to bring the regulator output within a narrow range around the nominal output voltage. Operation of the MOSFETs is disabled on startup until the regulator output is within a predefined range, and whenever the regulator output exceeds a limit range indicative of a fault condition.

The main advantages of the present invention are cost and size reduction, as the MOSFETs and an optional limiting resistor are both smaller and less expensive than the extra capacitors that would otherwise be needed to suppress load transients. The invention is particularly advantageous if the output voltage is low (less than 2V, which will be the voltage required by the next generation of microprocessors), due to the fact that energy stored in the output filter capacitor is a function of the square of the voltage. This squaring effect means that capacitors must be made disproportionately larger in order to suppress transients as the CPU voltage is reduced.

DETAILED DESCRIPTION OF THE INVENTION

Figure 1:
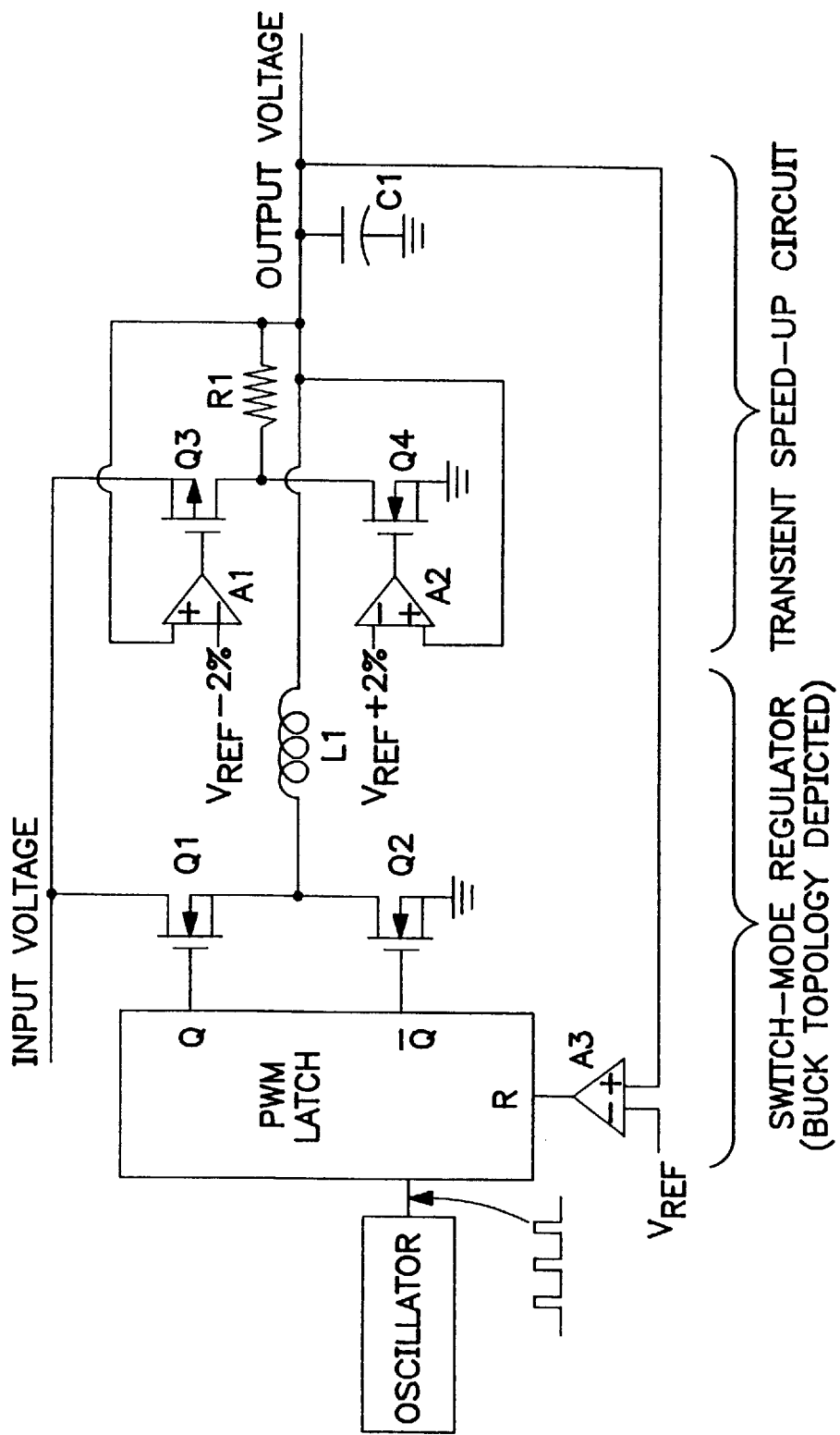
FIG. 1 is a circuit diagram for one embodiment of the present invention.
Figure 2:
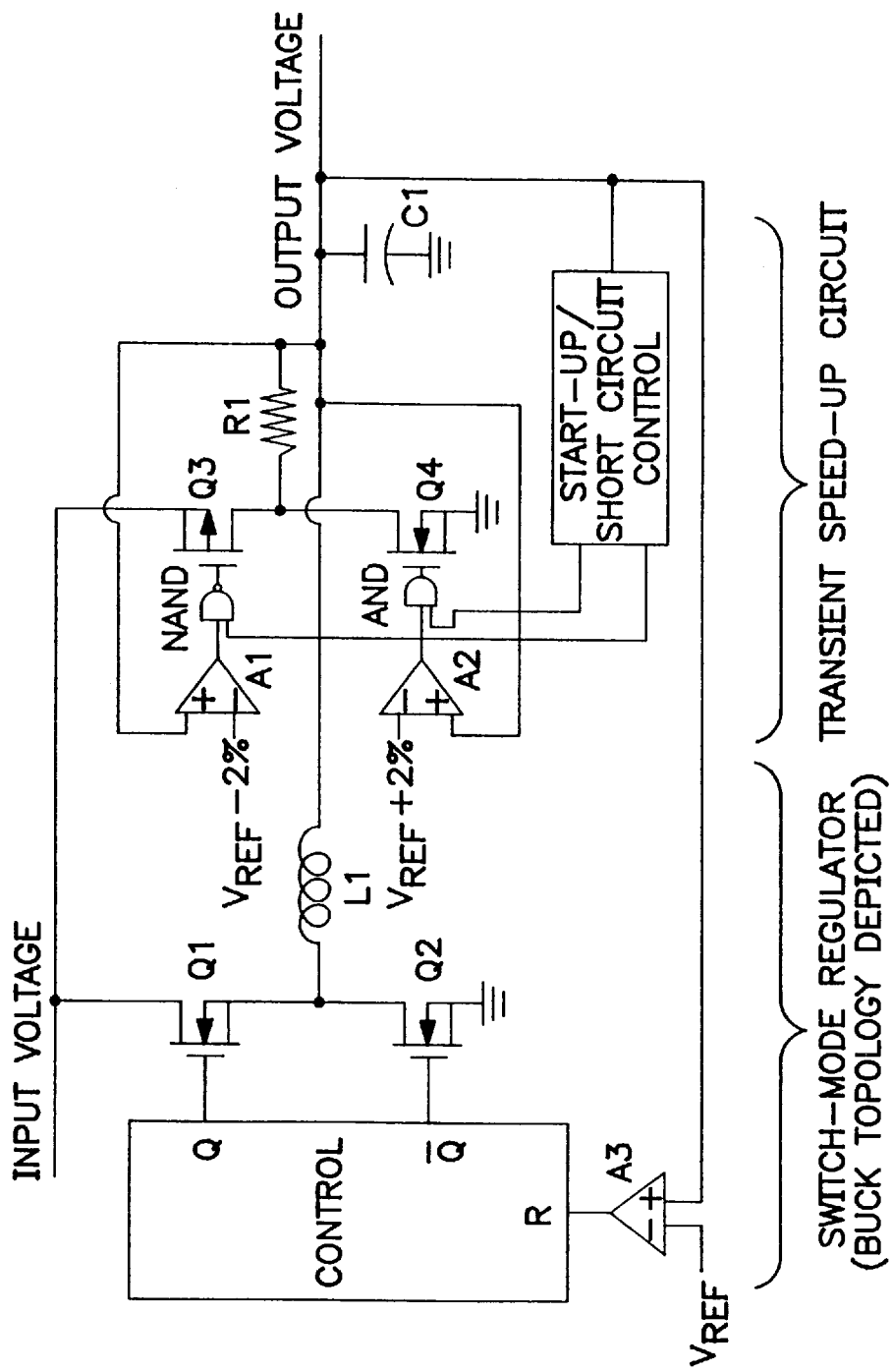
FIG. 2 is a circuit diagram similar to FIG. 1 but illustrating, in block form, additional circuitry to accommodate conditions such as short-circuits, output over-voltage and power-up.

First referring to FIG. 1, a circuit diagram for one embodiment of the present invention may be seen. In practice, and as latter described with respect to FIG. 2, additional circuitry is normally needed to accommodate conditions such as short-circuits and power-up, though the diagram of FIG. 1 is well suited to the illustration and description of the general principles of the invention.

In the embodiment shown, the PWM (pulse width modulation) logic block, p-channel MOSFET Q1 and n-channel MOSFET Q2, inductor L1, capacitor C1 and gain block A3 comprise a normal buck-topology switch-mode regulator, though it is to be understood that the invention is applicable to other regulator topologies as well. In each cycle of operation of the pulse width modulation block in the topology illustrated, MOSFET Q1 is turned on, causing an increasing current through the inductor L1 to the output. Then MOSFET Q1 is turned off and MOSFET Q2 is turned on until the current in the inductor returns to zero or, perhaps for heavy loads, until MOSFET Q1 is turned on again. The duration (pulse width) that MOSFET Q1 is on each cycle is controlled by the PWM logic responsive to the output voltage relative to the reference voltage Vref as both are applied to the gain block. For very light loads, MOSFET Q1 will be turned on for no more than a small fraction of each cycle, whereas for heavier loads, MOSFET Q1 will be turned on for a much larger fraction of each cycle. The inductor puts a limit on the maximum rate-of-change of load current that the switch-mode regulator can accommodate unaided. This maximum rate of change is $$\frac{VIN - VOUT}{L1} * DMAX$$

for a buck-topology regulator (where DMAX is the maximum duty factor of the pulse width modulated controller, and L1 is the inductance of the inductor).

Referring again to FIG. 1, p-channel MOSFET Q3 and n-channel MOSFET Q4, gain blocks A1 and A2, and current-limiting resistor R1 comprise the transient response speed-up circuit of the present invention. In addition, there is a reference voltage generator common to both circuits for generating not only Vref, but also Vref−2% and Vref+2% (voltages 2% less than Vref and 2% greater than Vref, respectively).

The circuit operates as follows: When the circuit is stabilized and the load is steady, the output voltage will be very close to Vref, with a small ripple (<2% to <<2%) dependent primarily on the load, the value of the output filter capacitor C1 and the frequency of operation of the PWM logic. Thus the non-inverting input to the gain block A1 is higher than the inverting input, holding the output of gain block A1 and thus the gate of MOSFET Q3 high to hold the MOSFET Q3 off. The inverting input to the gain block A2 will be higher than the non-inverting input, holding the output of gain block A2 and thus the gate of MOSFET Q4 low to hold the MOSFET Q4 off.

If the output voltage drops more than 2% due to a sudden load increase (faster than the normal dynamic response of the PWM logic control system), gain block A1 detects the error by its inverting input going above its non-inverting input, and turns on Q3 by driving its gate low. Current is drawn directly from the input voltage and is dumped into the output filter capacitor C1 and the regulator output itself, causing the output voltage to rise and bringing the output back into regulation. Similarly, if the output rises more than 2% (generally due to stored energy in L1) due to a sudden load decrease, gain block A2 detects the error by its non-inverting input going above its inverting input, and turns on Q4 by driving its gate high. Current now is drawn from C1 and shunted to ground (the circuit common connection). Output voltage variations that are less than ±2% in the exemplary embodiment are dealt with in normal fashion and with the normal regulator response by the switch-mode regulator.

In the circuit of FIG. 1, the MOSFETs Q3 and Q4 are intended to operate in the switching mode, not the linear mode. For this purpose, the gain blocks A1 and A2 should have a high gain, preferably in the form of uncompensated high gain analog voltage comparators or high gain analog amplifiers. If desired, the gain blocks may be provided with a slight hysteresis using well known methods, thereby also precluding linear operation of the MOSFETs Q3 and Q4. Also in the circuit of FIG. 1, resistor R1 is provided as a current limiting resistor for MOSFETs Q3 and Q4. This resistor is optional, as the MOSFETs may have their drains directly connected to the output of the regulator, and may themselves be proportioned so that their inherent ON-resistance provides the desired current limiting.

Upon first power-up, the preferred embodiment of the invention won't activate either MOSFET until after the output has been brought to close to its normal regulation point by the conventional buck regulator. This provides a benign soft start and avoids subjecting the input supply to a massive momentary current draw (which also might damage the MOSFETs). Also in the preferred embodiment of the invention, if the output voltage drops more than 6% due to a load change, the pulsing of MOSFET Q3 is inhibited, as such a large drop is indicative of a fault condition such as output overload or short circuit. Similarly, if the output rises more than 6% above normal due to an output over-voltage condition, pulsing of MOSFET Q4 is inhibited. These features are shown schematically in FIG. 2, wherein the start-up/short circuit control circuit senses the output voltage and provides outputs which in a first state override the outputs of gain blocks A1 and A2 to hold MOSFETs Q3 and Q4 off, regardless of the outputs of the gain blocks, and in a second state gate the drive signals so as to allow control of the MOSFETs Q3 and Q4 by the gain blocks A1 and A2, respectively. The start-up/short circuit control circuit would simply remain in the first state on start-up until the switch-mode regulator is in or at least near regulation, and then switch to the second state, returning to the first state if and whenever, and while, the output deviates from Vref by more than 6% in this embodiment. When in the first state, the output of the AND gate is held low, and the output of the NAND gate is held high, holding transistors Q3 and Q4 off.

When in the second state, the output of the AND gate is controlled by the output of amplifier/comparator A1, and the output of the NAND gate is controlled by the output of amplifier/comparator A2.

In the prior description of the preferred embodiment, limits of 2% before the transient response speed-up circuit becomes active, and 6% for indication of a fault condition, are merely one set of exemplary limits, and other values may be used as convenient and appropriate. On the upper side, the limit beyond which the transient response speed-up circuit becomes active (2% in the example) should be safely below the voltage variation which could cause a malfunction of or error in the circuitry driven by the regulator. On the lower side, this limit preferably should be greater than the normal ripple in the output voltage under maximum load conditions, as otherwise the transient response speed-up circuit can be unintentionally active under steady state high load conditions. Finally, the limit for indication of a fault condition (6% in the example) should be sufficiently beyond the limit at which the transient response speed-up circuit becomes active so as to allow the maximum normal transients to invoke the operation of the transient response speed-up circuit without going beyond the fault condition limit, yet be sufficiently limited so that any reasonable fault condition will force the output beyond such limit.

Figure 3:
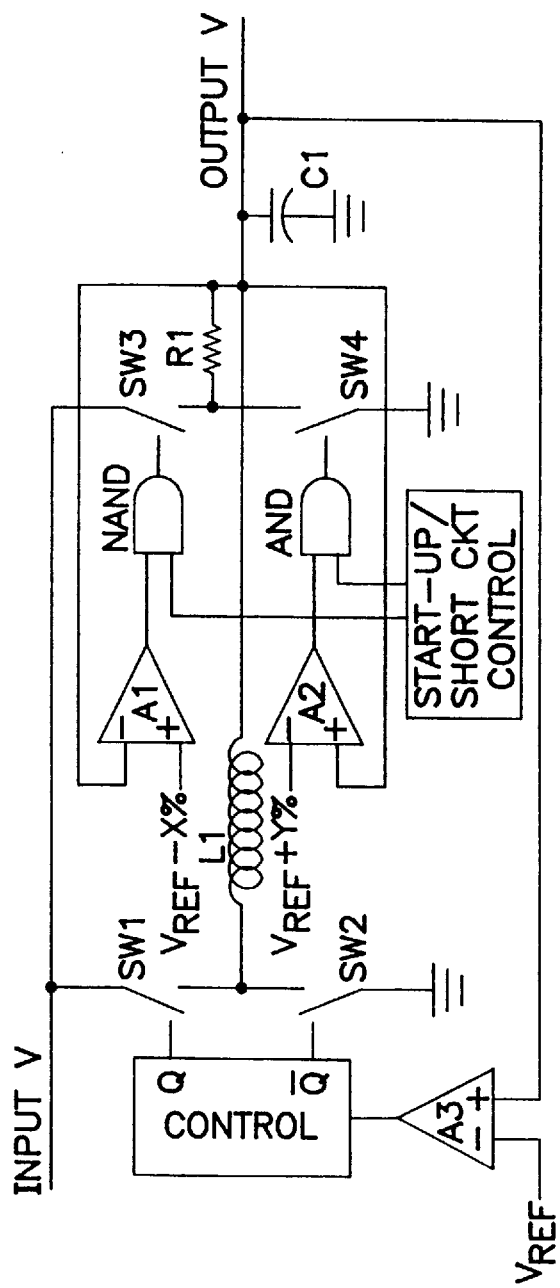
FIG. 3 is a circuit diagram similar to FIG. 2 using a general form of switch, which may be, by way of example, MOSFETs, bipolar transistors, JFETs or SCRs.

The main advantages of the present invention are cost and size reduction, as the MOSFETs Q3 and Q4 and the optional limiting resistor R1 are both smaller and less expensive than the extra capacitors that would otherwise be needed to suppress load transients. In that regard, FIG. 3 is an exemplary generalized circuit diagram similar to FIG. 2 using a general form of switch, (switches SW1 through SW4) which may be, by way of example, other types of semiconductor switches such as MOSFETs, bipolar transistors, JFETs or SCRs, or combinations of such devices. Again, while the preferred embodiment has been described with respect to a buck topology regulator and to pulse width modulation switch control logic, the invention is equally applicable to other switch-mode topologies, such as boost or flyback topologies, and other control architectures such as pulse-frequency modulation (PFM) switch control logic.

Finally, while the embodiments of the present invention have been disclosed for providing transient response speedup for both transient drops and transient surges in output voltage, such as may occur with sudden increases and decreases, respectively, in regulator load, the present invention may be used in "half-circuit" form to protect for either transient drops or transient surges in output voltage, the other type of transient possibly being tolerable, or possibly being confined in some other manner.

While the present invention has been disclosed and described. with respect to certain preferred embodiments thereof, it will be understood to those skilled in the art that the present invention may be varied without departing from the spirit and scope thereof.

What is claimed is:

1. A transient speed-up circuit for a switch-mode regulator including a regulator output terminal having a regulator voltage thereon, the transient speed-up circuit including an input terminal, an output terminal, and a common terminal, the output terminal for coupling to the regulator output terminal, comprising:
   a first switch coupled between the input terminal and the output terminal;
   a second switch coupled between the output terminal and the common terminal;
   a first circuit to turn on the first switch when the regulator voltage decreases below a reference voltage by a first amount; and, a second circuit to turn on the second switch when the regulator voltage increases above the reference voltage by a second amount.

2. The transient speed-up circuit of claim 1 wherein the first and second switches are coupled to the output terminal through a resistor.

3. The transient speed-up circuit of claim 1 further comprised of a start-up/short circuit control holding the first switch off when the regulator voltage decreases below the reference voltage by a third amount, the absolute value of the third amount exceeding the first amount, and holding the second switch off when the regulator voltage increases above the reference voltage by a fourth amount, the fourth amount exceeding the second amount.

4. The transient speed-up circuit of claim 1 wherein the first and second switches are semiconductor switches selected from the group consisting of MOSFETs, bipolar transistors, JFETs and SCRs.

5. The transient speed-up circuit of claim 1 wherein the first and second switches are MOSFETs.

6. The transient speed-up circuit of claim 5 wherein the first and second circuits are analog voltage comparators.

7. A switch-mode regulator comprising:
  first and second switches coupled in series;
  an inductor coupled between the first and second switches and a regulator output terminal having a regulator voltage thereon;
  a switch-mode regulator control coupled to the first and second switches;
  a third switch coupled between an input terminal and an output terminal;
  a fourth switch coupled between the output terminal and a common terminal;
  a first circuit to turn on the third switch when the regulator voltage decreases below a reference voltage by a first amount; and,
  a second circuit to turn on the fourth switch when the regulator voltage increases above the reference voltage by a second amount.

8. The switch-mode regulator of claim 7 wherein the third and fourth switches are coupled to the output terminal through a resistor.

9. The switch-mode regulator of claim 7 further comprised of a start-up/short circuit control holding the third switch off when the regulator voltage is below the reference voltage by a third amount, the third amount exceeding the first amount, and holding the fourth switch off when the regulator voltage increases above the reference voltage by a fourth amount, the fourth amount exceeding the second amount.

10. The switch-mode regulator of claim 7 wherein the first, second, third and fourth switches are semiconductor switches selected from the group consisting of MOSFETs, bipolar transistors, JFETs and SCRs.

11. The switch-mode regulator of claim 7 wherein the first, second, third and fourth switches are MOSFETS.

12. The switch-mode regulator of claim 7 wherein the first and second circuits are comparators.

13. The switch-mode regulator of claim 7 wherein the first and second circuits are high gain amplifiers.

14. The switch-mode regulator of claim 7 wherein the switch-mode regulator control is a pulse width modulation control.

15. The switch-mode regulator of claim 7 wherein the switch-mode regulator control is a pulse-frequency modulation control.

16. A method of operating a switch-mode regulator including a regulator output terminal having a regulator voltage thereon, to provide transient response speed-up, comprising:
  providing a first switch coupled between an input terminal and an output terminal;
  providing a second switch coupled between the output terminal and a common terminal;
  turning on the first switch when the regulator voltage decreases below a reference voltage by a first predetermined voltage increment; and,
  turning on the second switch when the regulator voltage increases above the reference voltage by a second predetermined voltage increment.

17. The method of operating a switch-mode regulator of claim 16 further comprising:
  providing a start-up/short circuit control;
  holding the first switch off when the regulator voltage decreases below the reference voltage by a third predetermined voltage increment, the third predetermined voltage increment exceeding the first predetermined voltage increment; and,
  holding the second switch off when the regulator voltage decreases below the reference voltage by a fourth predetermined voltage increment, the fourth predetermined voltage increment exceeding the second predetermined voltage increment.

18. The transient speed-up circuit of claim 17 wherein the first and second switches are coupled to the output terminal of the regulator through a resistor.

19. The transient speed-up circuit of claim 17 wherein the first and second switches are semiconductor switches selected from the group consisting of MOSFETs, bipolar transistors, JFETs and SCRs.

20. The transient speed-up circuit of claim 17 wherein the first and second switches are MOSFETs.

21. The transient speed-up circuit of claim 20 wherein the first and second circuits are voltage comparators.

22. A transient speed-up circuit for a switch-mode regulator including a regulator output terminal having a regulator voltage thereon, the transient speed-up circuit having an input terminal, an output terminal for coupling to the regulator output terminal, and a common terminal, comprising:
  a switch coupled between the input terminal and the output terminal; and, a circuit to turn on the switch when the regulator voltage drops by more than a first amount due to a sudden load increase on the regulator output terminal.

23. The transient speed-up circuit of claim 22 wherein the switch is coupled to the output terminal through a resistor.

24. The transient speed-up circuit of claim 22 further comprised of a start-up/short circuit control holding the switch off when the regulator voltage drops by more than a second amount due to a load change, the absolute value of the second amount exceeding the first amount.

25. The transient speed-up circuit of claim 22 wherein the switch is a semiconductor switch selected from the group consisting of MOSFETs, bipolar transistors, JFETs and SCRs.

26. The transient speed-up circuit of claim 22 wherein the switch is a MOSFET.

27. The transient speed-up circuit of claim 22 wherein the circuit comprises an analog voltage comparator.

28. A transient speed-up circuit for a switch-mode regulator including a regulator output terminal having a regulator voltage thereon, the transient speed-up circuit having an input terminal, an output terminal for coupling to the regulator output terminal, and a common terminal, comprising:

a switch coupled between the output terminal and the common terminal; and, a circuit to turn on the switch when the regulator voltage rises by more than a first amount due to a sudden load decrease on the regulator output terminal.

29. The transient speed-up circuit of claim 28 wherein the switch is coupled to the output terminal through a resistor.

30. The transient speed-up circuit of claim 28 further comprised of a second circuit holding the switch off when the regulator voltage rises by more than a second amount, the second amount exceeding the first amount.

31. The transient speed-up circuit of claim 28 wherein the switch is a semiconductor switch selected from the group consisting of MOSFETs, bipolar transistors, JFETs and SCRs.

32. The transient speed-up circuit of claim 28 wherein the switch is a MOSFET.

33. The transient speed-up circuit of claim 28 wherein the circuit is an analog voltage comparator.

34. A transient speed-up circuit for a switch-mode regulator including a regulator output terminal having a regulator voltage thereon, the transient speed-up circuit including an input terminal, an output terminal, and a common terminal, the output terminal for coupling to the regulator output terminal, comprising:

a first switch coupled between the input terminal and the output terminal;

a second switch coupled between the output terminal and the common terminal;

a first circuit to turn on the first switch when the regulator voltage drops by more than a first amount due to a sudden load increase on the regulator output terminal; and, a second circuit to turn on the second switch when the regulator voltage rises by more than a second amount due to a sudden load decrease on the regulator output terminal.

35. The transient speed-up circuit of claim 34 wherein the first and second switches are coupled to the output terminal through a resistor.

36. The transient speed-up circuit of claim 34 further comprising a start-up/short circuit control holding the first switch off when the regulator voltage drops by more than a third amount due to a load change, the absolute value of the third amount exceeding the first amount, and holding the second switch off when the regulator voltage rises by more than a fourth amount due to an output over-voltage condition, the fourth amount exceeding the second amount.

37. The transient speed-up circuit of claim 34 wherein the first and second switches are semiconductor switches selected from the group consisting of MOSFETs, bipolar transistors, JFETs and SCRs.

38. The transient speed-up circuit of claim 34 wherein the first and second switches are MOSFETs.

39. The transient speed-up circuit of claim 38 wherein the first and second circuits are analog voltage comparators.

* * * * *